US012673279B2

(12) United States Patent
Qiu

(10) Patent No.: US 12,673,279 B2
(45) Date of Patent: Jul. 7, 2026

(54) CONNECTION STRUCTURE FOR WATER PURIFICATION FILTER ELEMENT

(71) Applicant: QINGDAO PURUIJIA WATER PURIFICATION TECHNOLOGY CO., LTD., Qingdao (CN)

(72) Inventor: Guangbing Qiu, Qingdao (CN)

(73) Assignee: QINGDAO PURUIJIA WATER PURIFICATION TECHNOLOGY CO., LTD., Qingdao (CN)

( * ) Notice: Subject to any disclaimer, the term of this patent is extended or adjusted under 35 U.S.C. 154(b) by 604 days.

(21) Appl. No.: 18/108,262

(22) Filed: Feb. 10, 2023

(65) Prior Publication Data

US 2024/0001266 A1     Jan. 4, 2024

(30) Foreign Application Priority Data

Jun. 30, 2022    (CN) .......................... 202221692998.2

(51) Int. Cl.
B01D 29/96          (2006.01)
(52) U.S. Cl.
CPC ..................................... B01D 29/96 (2013.01)
(58) Field of Classification Search
CPC .............. B01D 29/96; B01D 2201/302; B01D 2201/303; B01D 2201/4023; B01D 35/30
USPC ......................................... 210/232, 440–444
See application file for complete search history.

(56) References Cited

FOREIGN PATENT DOCUMENTS

CN          211885684 U   * 11/2020

OTHER PUBLICATIONS

China National Intellectual Property Admininstration, Office Action, CN Application No. 202221692998.2, mailed Nov. 28, 2022, 3 pages.

* cited by examiner

*Primary Examiner* — Madeline Gonzalez

(74) *Attorney, Agent, or Firm* — Mahamedi IP Law LLP

(57)          ABSTRACT

The present disclosure provides a connection structure for a water purification filter element and belongs to the technical field of a connection structure for the water purification filter element. The connection structure for a water purification filter element includes: a shell which is configured to be mounted on a filter element; and a connector, which is partially mounted in a slidable manner in an upper opening of the shell and has a connected state and a separated state. The connection structure for the water purification filter element, which is provided by the present disclosure, includes the shell and the connector partially arranged in the shell; an operator changes a position of the connector, which extends into the shell, by pushing the shell to move so as to implement switching of the connector between the connected state and the separated state; in the process of replacing the filter element, the connector can be controlled to be switched between a first position and a second position only by pressing the filter element to drive the shell to move, so that separation and connection between the filter element and a connection head can be implemented; the connection structure is simple and easy to operate; the phenomenon of clamping stagnation of fit between the connector and the shell is avoided; and smoothness of the assembling and disassembling process of the filter element is ensured.

16 Claims, 7 Drawing Sheets

CONNECTION STRUCTURE FOR WATER PURIFICATION FILTER ELEMENT

CROSS REFERENCE TO RELATED APPLICATION

This patent application claims the benefit and priority of Chinese Patent Application No. 202221692998.2, filed on Jun. 30, 2022 with the China National Intellectual Property Administration and entitled "Connection structure for connecting a water purification filter element onto a connection head of a refrigerator", which is hereby incorporated by reference in its entirety.

TECHNICAL FIELD

The present disclosure relates to the technical field of a connection structure for a water purification filter element, and particularly relates to a connection structure for a water purification filter element.

BACKGROUND

A filter element in a water purifier belongs to a consumable part of the water purifier, and needs to be replaced after a period of use so as to keep the conventional water purification function of the water purifier. The filter element generally is mounted on a connection head on filter equipment through screw threads, and in such manner, the filter element with a narrow mounting position is very inconvenient to replace. Therefore, the Chinese patent document CN211885684U has disclosed a clamping mechanism for a water purification filter element; a clamping assembly is fixedly arranged on a filter element top cover; the clamping assembly is clamped on a connector; the connector is fixedly arranged on external equipment; clamping of the clamping assembly and the connector is realized by controlling a grabbing clamp to be opened and closed; and the clamping mechanism is convenient to assemble and disassemble. However, switching of different working states is implemented by means of the circulating motion of a U-shaped rod at different positions in a ring-shaped slot, and due to the irregular structure characteristic of the ring-shaped slot, clamping stagnation is liable to occur between the U-shaped rod and the ring-shaped slot in the moving process of the U-shaped rod, resulting in that the assembling and disassembling process of the filter element is blocked.

SUMMARY

Therefore, the present disclosure is to solve a technical problem that due to the irregular structure characteristic of a ring-shaped slot in a clamping mechanism for a water purification filter element in the prior art, clamping stagnation is liable to occur between a U-shaped rod and the ring-shaped slot in the moving process of the U-shaped rod, resulting in that the assembling and disassembling process of the filter element is blocked, so as to provide a connection structure for a water purification filter element.

In order to solve the technical problem above, the present disclosure provides a connection structure for a water purification filter element, including:

a shell, which is configured to be mounted on a connection head of a filter element and has an upper opening; and a connector, which is partially mounted in a slidable manner in the upper opening, one end of the connector, which extends into the shell, having a first position configured to be fixed to an inner side wall of the shell and a second position wherein the end of the connector has been slid to be fixed to the top of the side wall of the shell, so that the connector has a separated state in which the connector has been slid in a direction of retracting into the shell to be separated from the connection head and a connected state in which the connector has been slid in a direction of extending out of the upper opening to be connected to the connection head.

Optionally, the end of the connector, which extends into the shell, is rotatably connected with a shiftable block; a limiting space configured for the shiftable block to move therein and a blocking position configured to block the connector from completely extending out of the upper opening are formed in the side wall of the shell; when the shiftable block is positioned at the blocking position, the connector is positioned at the second position; a clamping position for keeping the position of the shiftable block unchanged is formed in the limiting space; when the shiftable block is positioned at the clamping position, the connector is positioned at the first position; the shiftable block is configured to be switched between the blocking position and the clamping position in the process of sliding in the limiting space so as to drive the connector to be switched between the second position and the first position.

Optionally, an abutting portion disposed correspondingly to the shiftable block is formed in the limiting space; and in the process that the shell slides relative to the connector, the shiftable block touches the abutting portion and is enabled to rotate, so that the connector is switched between the first position and the second position.

Optionally, chutes are respectively formed at both opposite ends of the shiftable block, turnable portions are formed at positions of the chutes on the shiftable block, and the turnable portions are in clamping fit with the abutting portion.

Optionally, two turnable portions are formed on each end face with the chute.

Optionally, the connector has a clamping portion and a connection portion, the clamping portion extends out of the shell and is configured to be clamped to the connection head, the connection portion is mounted in a slidable manner in the upper opening, and the connection portion has a sliding face in sliding contact with an inner wall of the upper opening.

Optionally, the sliding face is of an arc shape, and the arc-shaped sliding face, in the process that the connection portion slides along the upper opening, drives the clamping portion to be deflected, so that the connector is switched between the connected state and the separated state.

Optionally,

The connector is also provided with a blocking portion, the clamping portion and the connection portion are respectively disposed on both sides of the blocking portion, the blocking portion is configured to abut against the upper opening to block the clamping portion from sliding into the shell.

Optionally, an arc shape of the sliding face protrudes towards an extending direction of the blocking portion.

Optionally, two connectors are arranged opposite to each other; when the connectors are in the separated state, the clamping portions of the two connectors are close to each other in the first position; and when the connectors are in the connected state, the clamping portions of the two connectors are away from each other in the second position.

Optionally, each connector is provided with the blocking portion, and the blocking portions of two connectors are arranged in a back-to-back manner.

Optionally,

An end portion of the connector, which is positioned in the shell, is connected with a supporting plate, and the supporting plate is mounted in a slidable manner in the shell; and One end of the supporting plate, which is away from the connector, is connected with a positioning plate, and the shiftable block is rotatably mounted on the positioning plate.

Optionally,

A limiting rib is arranged at a side edge of the positioning plate, a limiting edge is formed at the top of the inner side wall of the shell, and the limiting rib is configured to abut against a lower surface of the limiting edge to form the blocking position for blocking the connector from completely extending out of the upper opening; when the shiftable block is positioned at the blocking position, the limiting rib abuts against the limiting edge, and the connector is in the connected state; when the shiftable block is positioned at the clamping position, the connector partially retracts into the shell, the limiting rib is away from the limiting edge, and the connector is in the separated state; and the shiftable block is rotatably arranged on the positioning plate so as to be switchable between the blocking position and the clamping position.

Optionally,

The supporting plate is provided with a fixed rod, the fixed rod is sleeved with an elastic member, and the elastic member has a first elastic force for biasing the positioning plate to move towards the upper opening of the shell.

Optionally, two connectors are connected with the supporting plate through elastic sheets, and when the connector is in the connected state, the elastic sheet has a second elastic force for biasing the sliding face to abut tightly against the inner wall of the shell.

Optionally, a bottom plate of the shell is provided with a guiding slot, and the elastic member is positioned in the guiding slot.

Optionally, the shell includes a fixing box and a fixing cover which are in clamping fit, and the upper opening is formed at the top ends of the fixing box and the fixing cover.

The technical solution of the present disclosure has the following advantages that:

1. According to the connection structure for the water purification filter element, which is provided by the present disclosure, the shell is mounted on the filter element; the shell has the upper opening; the connector is mounted in a slidable manner in the upper opening of the shell; one end of the connector, which extends into the shell, has the first position capable of being fixed to the inner side wall of the shell; the connector also has the second position wherein the end of the connector has been slid to be fixed to the top of the side wall of the shell; when the connector is positioned at the first position, the connector has the separated state in which the connector has been slid in the direction of retracting into the shell to be separated from the connection head; when the connector is positioned at the second position, the connector has the connected state in which the connector has been slid in the direction of extending out of the upper opening of the shell to be connected to the connection head; separation and connection between the filter element and the connection head can be implemented by controlling the connector to be switched between the first position and the second position; the connection structure is simple and easy to operate; the phenomenon of clamping stagnation of fit of the connector is avoided; and smoothness of the assembling and disassembling process of the filter element is ensured.

2. According to the connection structure for the water purification filter element, which is provided by the present disclosure, the end of the connector, which extends into the shell, is rotatably connected with the shiftable block; the limiting space configured for the shiftable block to move therein and the blocking position configured to block the connector from completely extending out of the upper opening of the shell are formed in the side wall of the shell; at the blocking position, the connector is positioned at the second position; the clamping position for keeping the position of the shiftable block unchanged is also formed in the limiting space; at the clamping position, the connector is positioned at the first position; the shiftable block slides in the limiting space to be switched between the blocking position and the clamping position so as to drive the connector to be switched between the second position and the first position, thereby further improving smoothness of switching the connector between the separated state and the connected state; an operator changes the position of the shiftable block in the shell by pushing the shell to move so as to implement switching of the connector between the connected state and the separated state; in the process of replacing the filter element, only the filter element needs to be pressed to drive the shell to move; and the connection structure is simple and easy to operate.

3. According to the connection structure for the water purification filter element, which is provided by the present disclosure, the connector is provided with the clamping portion, the connection portion, and the blocking portion, wherein the clamping portion extends out of the shell and can be clamped to the connection head, the connection portion is mounted in a slidable manner in the upper opening of the shell, and the blocking portion is positioned outside the shell and is configured to block the connector from completely sliding into the upper opening of the shell. The connection portion has the sliding face in sliding contact with the side edge of the upper opening of the shell, and in the sliding process of the connection portion, under the action of the sliding face, the clamping portion is switched between the connected state and the separated state.

BRIEF DESCRIPTION OF THE DRAWINGS

In order to more clearly illustrate the technical solution of the specific embodiments of the present disclosure or the prior art, the drawings of the specific embodiments or description in the prior art will be briefly described in the following. It is obvious that the described drawings are only related to some embodiments of the present disclosure, and those ordinary skilled in the art also can obtain other drawings, without any inventive work, according to the drawings.

REFERENCE SIGNS

Figure 1:
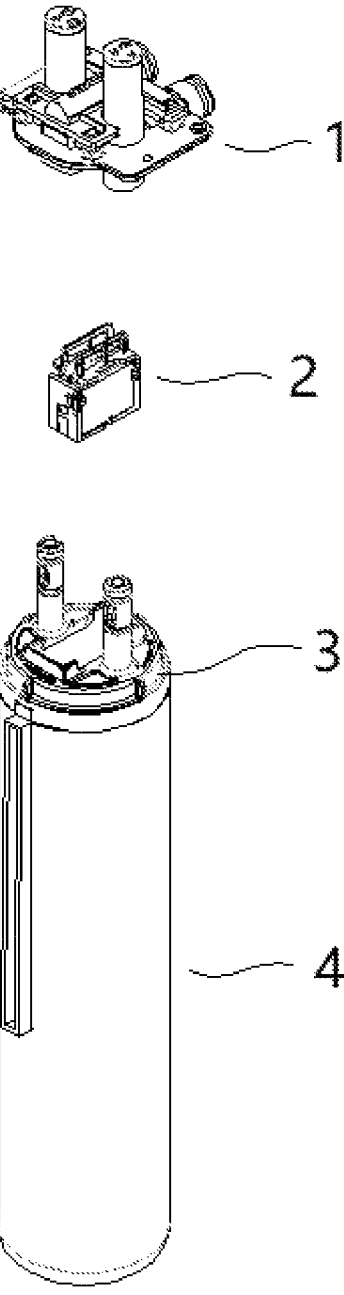
FIG. 1 is an explosive view of a connection structure provided by an embodiment of the present disclosure as well as a connection head and a filter element.
Figure 2:
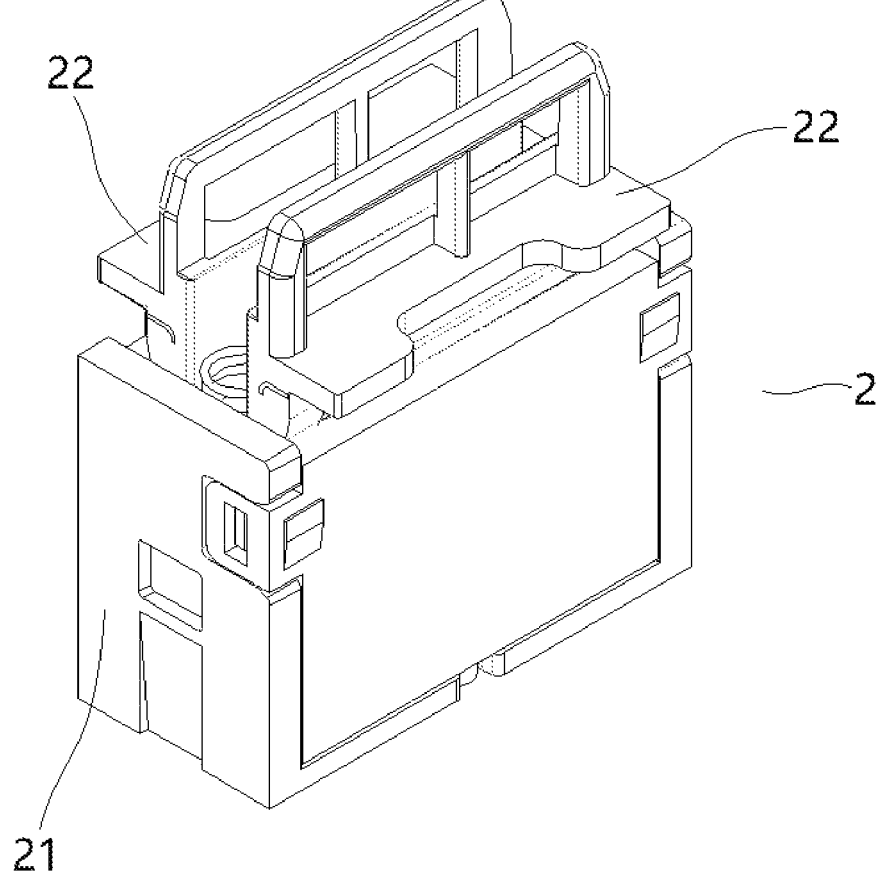
FIG. 2 is a structural schematic diagram of the connection structure provided by the embodiment of the present disclosure.

1—connection head; 2—connection structure; 3—filter cover; 31—mounting groove; 32—positioning groove; 4—filter element; 22—connector; 221—clamping portion; 223—blocking portion; 222—connection portion; 2221—sliding face; 21—shell; 211—limiting edge; 61—fixing box; 62—fixing cover; 7—shiftable block; 71—chute; 72—turnable portion; 8—positioning plate; 81—limiting rib; 9—fixed rod; 10—supporting plate; 11—elastic sheet; 12—elastic member; 13—guiding slot; 14—limiting space; 15—abutting portion; 16—withstanding portion; 17—buckle; and 18—clamping groove.

DETAILED DESCRIPTION

Embodiment

The embodiment provides a specific implementation mode of a connection structure for a water purification filter element. As shown in FIG. 1, FIG. 2, FIG. 3, and FIG. 4, a connection head 1 is mounted on a refrigerator; a filter cover 3 is mounted on a filter element 4; the connection structure 2 is mounted on the filter cover 3; the connection structure 2 includes a shell which has an upper opening and a connector 22 which is partially mounted in a slidable manner in the upper opening of the shell 21; and one end of the connector 22, which extends into the shell 21, has a first position configured to be fixed to an inner side wall of the shell 21 and a second position wherein the end of the connector has been slid to be fixed to the top of the side wall of the shell 21. When the connector 22 is positioned at the first position, the connector 22 has a separated state in which the connector 22 has been slid in a direction of retracting into the shell 21 to be separated from the connection head 1; and when the connector 22 is positioned at the second position, the connector 22 has a connected state in which the connector 22 has been slid in a direction of extending out of the upper opening of the shell 21 to be connected to the connection head 1; the connector 22 is controlled to be switched between the first position and the second position, so that the connector 22 can be switched between the separated state and the connected state, thereby implementing separation and connection between the filter element 4 and the connection head 1; the connection structure is simple and convenient to operate; the connector 22 smoothly moves in the assembling and disassembling process; and smoothness of assembly and disassembly of the filter element is ensured.

Specifically, the end of the connector 22, which extends into the shell 21, is rotatably connected with a shiftable block 7; a limiting space 14 which allows the shiftable block 7 to move therein and a blocking position capable of blocking the connector 22 from completely extending out of the upper opening of the shell 21 are formed in the side wall of the shell 21; at the blocking position, the connector 22 is positioned at the second position; a clamping position for keeping the position of the shiftable block unchanged is formed in the limiting space 14; and at the clamping position, the connector 22 is positioned at the first position. The shiftable block 7 can drive the connector 22 to be switched between the blocking position and the clamping position in the process of sliding in the limiting space 14, so that the connector 22 has a connected state in which the connector 22 has been slid in a direction of extending out of the upper opening of the shell 21 to be clamped to the connection head 1 and a separated state in which the connector 22 has been slid in a direction of retracting into the shell 21 to be separated from the connection head 1. An operator presses the filter element, then the shiftable block 7 is driven to move in the moving process of the filter element 4, and the shiftable block 7 is switched between the blocking position and the clamping position to drive the connector 22 to be switched between the second position and the first position so as to complete switching of the connector 22 between the connected state and the separated state, thereby facilitating disassembling and mounting the filter element.

Specifically, the connector 22 has the connected state in which a clamping portion 221 is clamped to the connection head 1 and the separated state in which the clamping portion 221 is separated from the connection head 1, and in the process that the shell 21 slides along the connector 22, the connector 22 can be switched between the connected state and the separated state. The connector 22 has a limiting edge 211 at the top end of the side wall of the shell 21.

Specifically, the connector 22 includes a clamping portion 221, a blocking portion 223, and a connection portion 222; the connector 22 is of a T shape; the blocking portion 223 is positioned at the middle position; the blocking portion 223 can block the clamping portion 221 from sliding into the shell 21, wherein the clamping portion 221 and the blocking portion 223 are positioned outside the shell 21; the clamping portion 221 is configured to be clamped with the connection head 1; the connection portion 222 is mounted in a slidable manner in the upper opening of the shell 21, and the connection portion 222 has an arc-shaped sliding face 2221; the inner wall of the upper opening of the shell 21 is in contact connection with the sliding face 2221; when the arc-shaped sliding face 2221 follows up the connection portion 222 to slide, the sliding face 2221 may interfere with the inner wall of the upper opening of the shell 21, so that the clamping portion 221 and the blocking portion 223 of the connector 22 are deflected; and when the clamping portion 221 of the connector 22 is deflected, the connector 22 can be switched between the connected state and the separated state, so that the connector 22 can be disconnected from the connection head 1 or connected with the connection head 1.

In this embodiment, an end portion of the connector 22, which is positioned in the shell 21, is connected with a supporting plate 10; the supporting plate 10 is mounted in a slidable manner in the shell 21; one end of the supporting plate 10, which is away from the connector 22, is connected with a positioning plate 8; and the shiftable block 7 is rotatably mounted on the positioning plate 8 so as to be switched between the blocking position and the clamping position. Specifically, the end portion of the connector 22 is connected with the supporting plate 10 through an elastic sheet 11, so that the connector 22 can swing on the supporting plate 10; and meanwhile, when the connector 22 is in the connected state, the elastic sheet 11 has a second elastic force for biasing the sliding face 2221 to abut tightly against the inner wall of the shell 21. A limiting rib 81 is arranged at a side edge of the positioning plate 8, and the limiting rib 81 can abut against a lower surface of the limiting edge 211 so as to prevent the connector 22 from sliding out of the shell 21.

In this embodiment, two connectors 22 are arranged opposite to each other; both the connectors 22 are provided with the blocking portions 223; the blocking portions 223 of the two connectors 22 are arranged in a back-to-back manner; the arc-shaped sliding faces 2221 protrude towards an extending direction of the blocking portions 223; and the sliding faces 2221 arranged in a back-to-back manner are in sliding contact with the opposite inner wall faces of the upper opening. When the positioning plate 8 drives the shiftable block 7 to slide in the shell 21 towards a direction away from the upper opening of the shell 21, the arc-shaped sliding faces 2221 on the connection portions 222 are extruded by the inner wall of the upper opening of the shell 21 so as to make the clamping portions 221 of the two connectors 22 close to each other, after the clamping portions 221 are close to each other, the clamping portions 221 can be separated from clamping connection of the connection head 1, and at the moment, the filter element 4 can be taken down; and when the positioning plate 8 drives the shiftable block 7 to slide in the shell 21 towards a direction close to the upper opening of the shell 21, the arc-shaped sliding faces 2221 on the connection portions 222 are separated from extrusion of the inner wall of the upper opening of the shell 21, under the action of the elastic forces of the elastic sheets 11, the connectors 22 are away from each other, at the moment, the clamping portions 221 are recovered to an expanded state, and the clamping portions 221 can be clamped onto the connection head 1 so as to complete mounting of the filter element 4 and the connection head 1.

Figure 3:
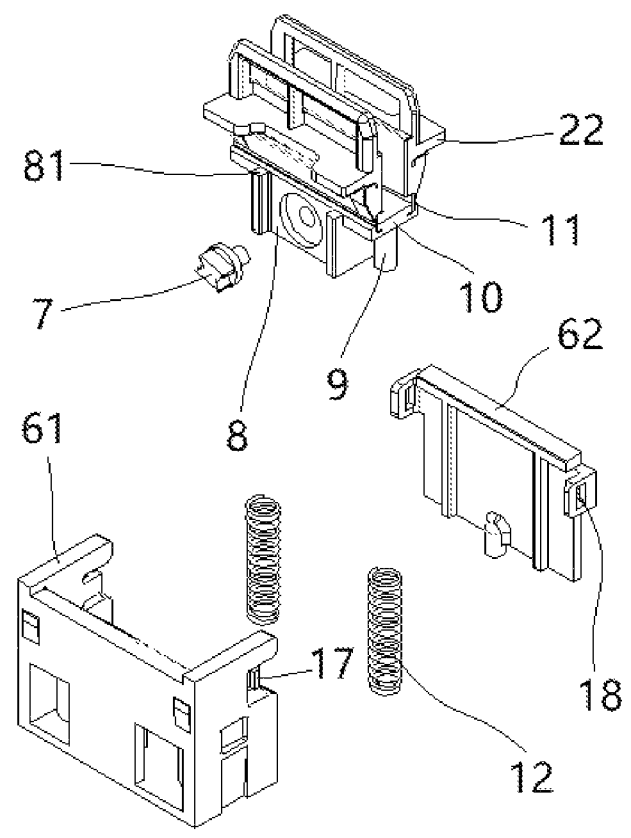
FIG. 3 is an explosive view of the connection structure provided by the embodiment of the present disclosure.
Figure 4:
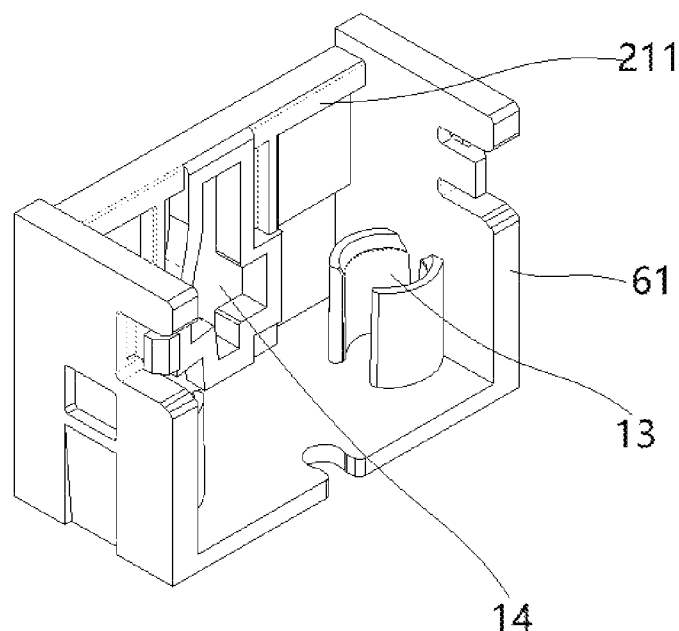
FIG. 4 is a structural schematic diagram of a fixing box provided by the embodiment of the present disclosure.

In this embodiment, as shown in FIG. 3 and FIG. 4, the shell 21 includes a fixing box 61 and a fixing cover 62 which are in clamping fit; the upper opening is formed at the top ends of the fixing box 61 and the fixing cover 62; a guiding slot 13 is formed at the bottom of the fixing box 61; the fixed rod 9 on the supporting plate 10 is mounted in a slidable manner in the guiding slot 13; the fixed rod 9 is sleeved with an elastic member 12; the elastic member 12 is positioned in the guiding slot 13; the elastic member 12 has a first elastic force for biasing the positioning plate 8 to move towards upper opening of the shell 21; and a semiarc-shaped plate is arranged at the bottom of the fixing box 61 to form the guiding slot 13. The limiting space 14 is formed on a side face of the fixing box 61.

Specifically, the fixing box 61 is provided with a buckle 17, the fixing cover 62 is provided with a clamping groove 18, and mounting of the fixing box 61 and the fixing cover 62 is completed by matching of the buckle 17 and the clamping groove 18. Specifically, a vertical bar is arranged in the side wall of the fixing cover 62 so as to reinforce the strength of a transverse bar and improve safety performance.

Figure 5:
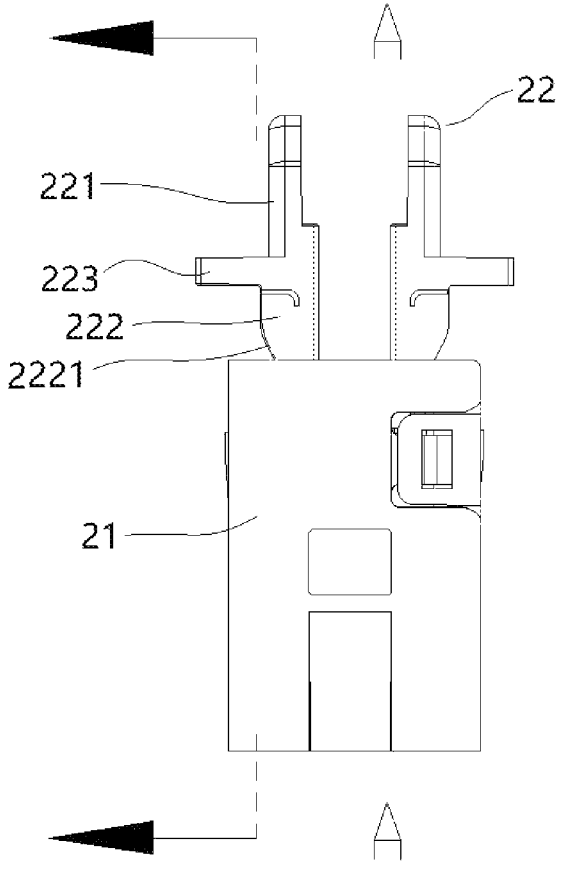
FIG. 5 is a structural schematic diagram of the connection structure provided by the embodiment of the present disclosure in a connected state.
Figure 6:
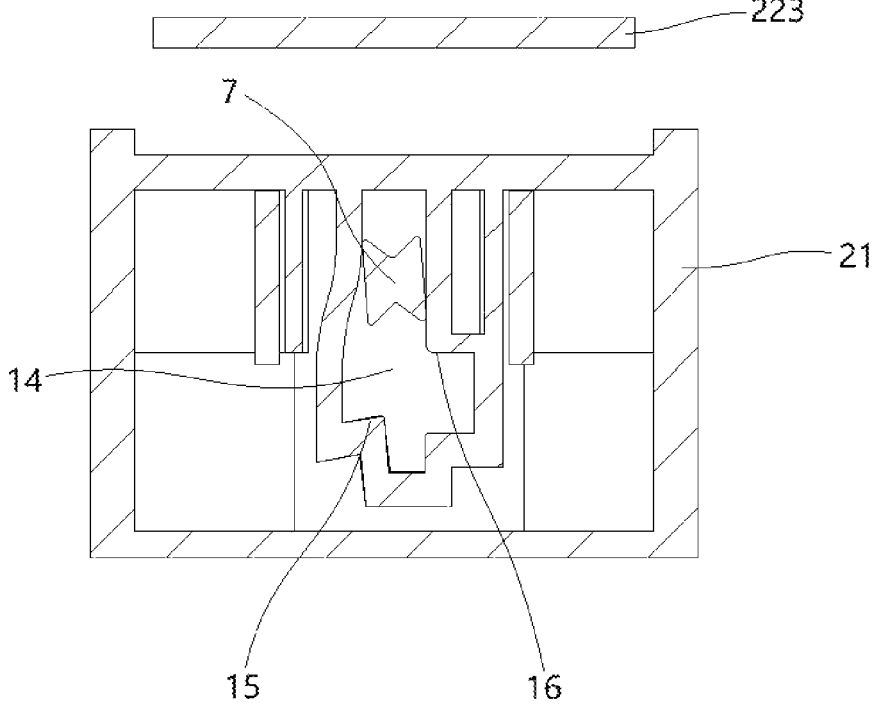
FIG. 6 is a section view of an A-A position in FIG. 5.

As shown in FIG. 4, the limiting space 14 for the shiftable block 7 to move is formed on the side wall of the fixing box 61; there is the clamping position in the limiting space 14; the abutting portion 15 disposed correspondingly to the shiftable block 7 is also formed in the limiting space 14; and in the process that the shell 21 slides relative to the connector 22, the shiftable block 7 touches the abutting portion 15, then is enabled to rotate, and can continue to move in the limiting space 14, so that the connector 22 is switched between the first position and the second position. As shown in FIG. 5 and FIG. 6, the connector 22 is in the connected state; when the operator grabs the filter element 4 to drive the shell 21 to move towards the connection head 1, the positioning plate 8 in the shell 21 drives the shiftable block 7 to move towards the upper opening of the shell 21; the shiftable block 7 moves downwards in the limiting space 14; when the chute 71 on the shiftable block 7 is in contact with the abutting portion 15, the shiftable block 7 rotates; at the moment, the operator loosens the filter element 4; the positioning plate 8 enables the shell 21 to have a trend of departing from the connection head 1 under the action of the elastic acting force of the elastic member 12; the shiftable block 7 which rotates by a certain angle is clamped at the clamping position by a withstanding portion 16 in the limiting space 14 and the inner wall of the limiting space 14, so that the positioning plate 8 cannot move; in the process that the shell 21 moves towards the connection head 1, the upper opening of the shell 21 extrudes the sliding faces 2221 of the connection portions 222, so that the clamping portions 221 of the two connectors 22 are close to each other and the two connectors 22 are switched into the separated state; and at the moment, under the blocking action of the shiftable block 7, the connector 22 is kept in the separated state, so that the filter element 4 can be taken down from the connection head 1.

Figure 9:
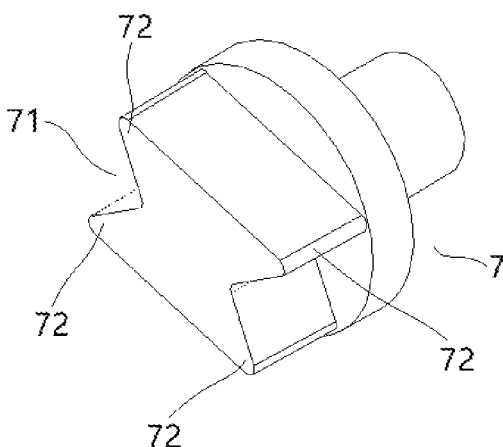
FIG. 9 is a structural schematic diagram of a shiftable block provided by the embodiment of the present disclosure.

Specifically, as shown in FIG. 9, the chutes 71 are respectively formed at both opposite ends of the shiftable block 7, turnable portions 72 are formed at positions of the chutes 71 on the shiftable block 7, and the turnable portions 72 can be in clamping fit with the abutting portion. Two turnable portions 72 are formed on each end face with the chute 71 on the shiftable block 7, the turnable portions 72 are disposed correspondingly to the abutting portion 15 and the withstanding portion 16, and the turnable portions 72 are blocked by the abutting portion 15 and the withstanding portion 16 so as to implement rotation and position limitation of the shiftable block 7.

Figure 7:
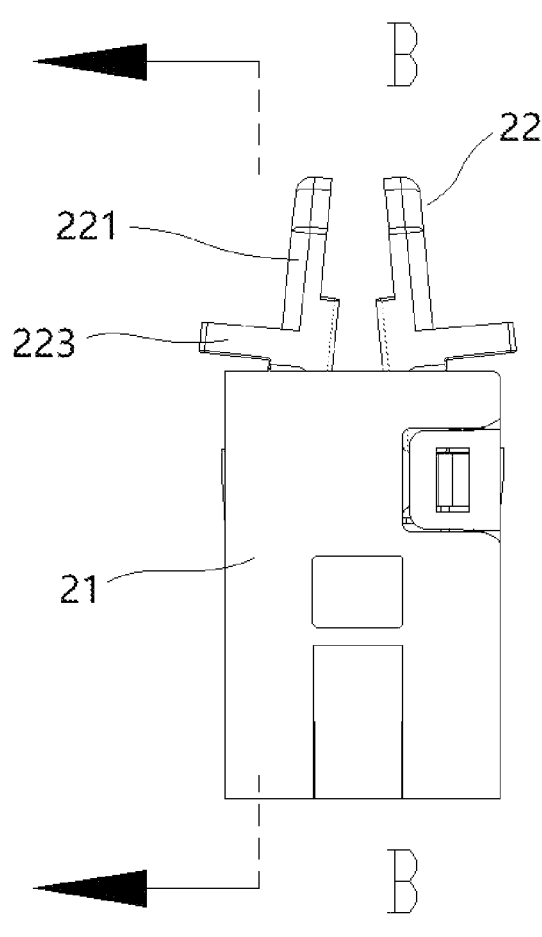
FIG. 7 is a structural schematic diagram of the connection structure provided by the embodiment of the present disclosure in a separated state.
Figure 8:
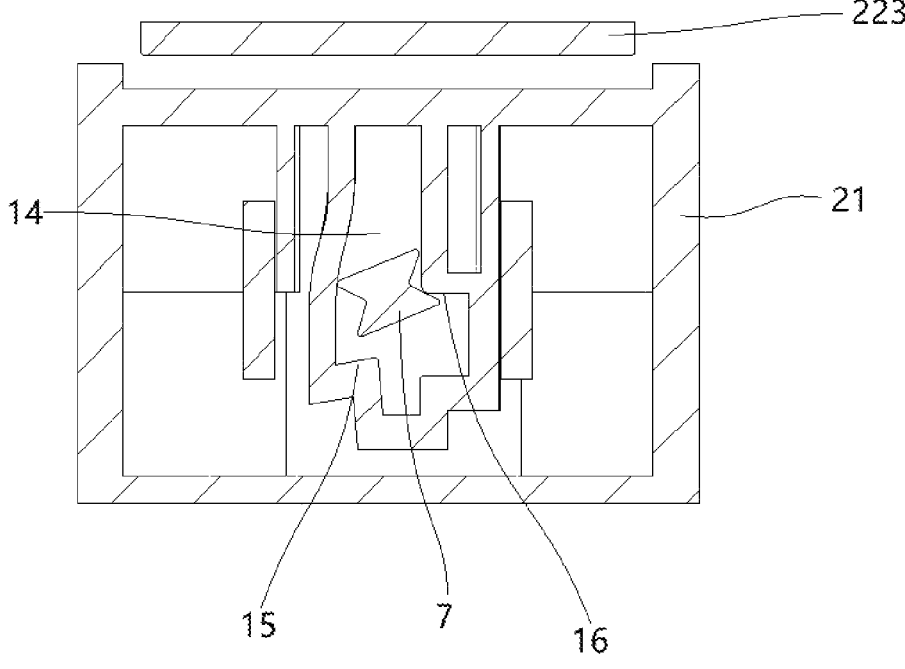
FIG. 8 is a section view of a B-B position in FIG. 7.

When the filter element 4 needs to be mounted, the connector 22 needs to be switched into the connected state from the separated state. As shown in FIG. 7 and FIG. 8, when the connector 22 is in the separated state, the shiftable block 7 is positioned at the clamping position; at the moment, the operator holds the filter element 4 to enable the shell 21 to be aligned with the connection head 1 and carries out pressing towards the direction of the connection head 1; in the pressing process, the left end of the shiftable block 7 is moved to the position of the abutting portion 15, the right end of the shiftable block 7 is away from the withstanding portion 16 and is continuously rotated until it is in contact with the bottom of the limiting space 14; at the moment, the shiftable block 7 is at an angle of inclining towards the bottom right direction; after the operator loosens the filter element 4, under the action of the elastic force of the elastic member 12, the positioning plate 8 drives the shiftable block 7 to move towards the upper opening of the shell 21; in the process that the shiftable block 7 moves upwards, the right side of the shiftable block 7 touches the withstanding portion 16 to be continuously rotated towards the bottom right direction until the two chutes 71 of the shiftable block 7 are in a vertical state, and at the moment, the shiftable block 7 can continue to move upwards until the limiting rib 81 abuts against the limiting edge 211 to the blocking position; and in the process that the shiftable block 7 moves upwards, the arc-shaped sliding face 2221 moves to the outside of the shell 21, under the action of the elastic sheet 11, the clamping portions 221 of the connectors 22 are away from each other, and the clamping portions 221 are respectively clamped on the connection head 1, so that the connectors 22 are in the connected state. In this embodiment, the shiftable block 7 is matched with a slide by a rotation shaft, so that the connection structure has good lubricity and is smooth to mount and disassemble; and moreover, the rotation shaft is directly assembled with a clamping assembly and does not bear the elastic force in the mounting process, when being integrally mounted to the fixing box, the rotation shaft is mounted in the slide, and the rotation shaft has small elasticity and is easy to assemble.

Specifically, the elastic member 12 is a spring. As a replaceable implementation mode, the elastic member 12 may also be one of other parts with elasticity, such as an elastic bellows, a rubber pad, etc.

Figure 10:
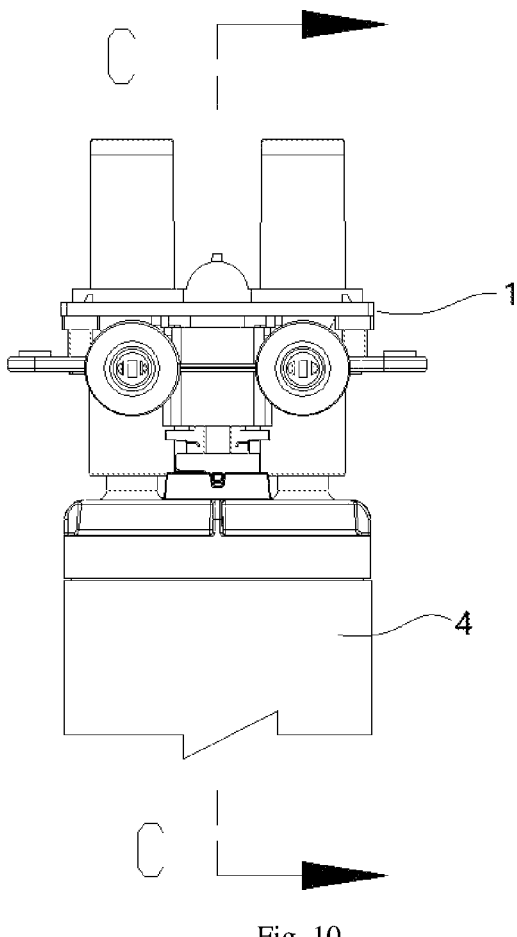
FIG. 10 is a schematic diagram of connection between the connection structure provided by an embodiment of the present disclosure and the connection head as well as the filter element.
Figure 11:
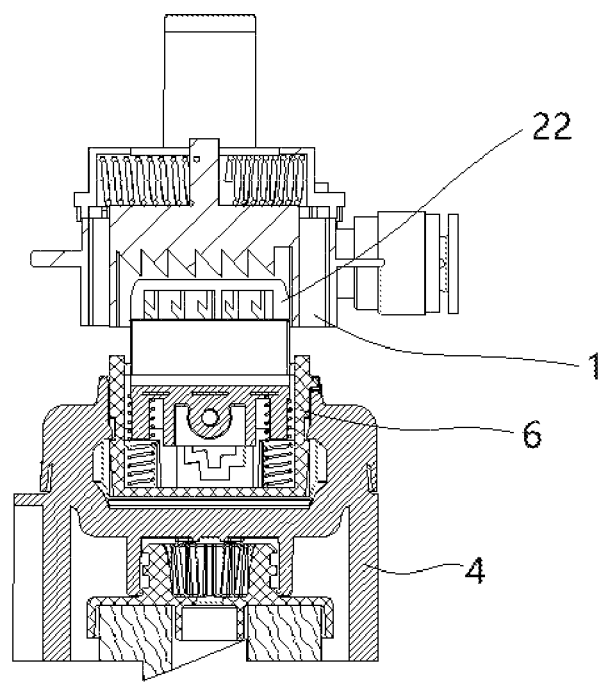
FIG. 11 is a section view of a C-C position in FIG. 9.

As shown in FIG. 10 and FIG. 11, the clamping portion 221 of the connector 22 hooks an inverted hook on the connection head 1 so as to implement clamping of the clamping portion 221 to the connection head 1.

Figure 12:
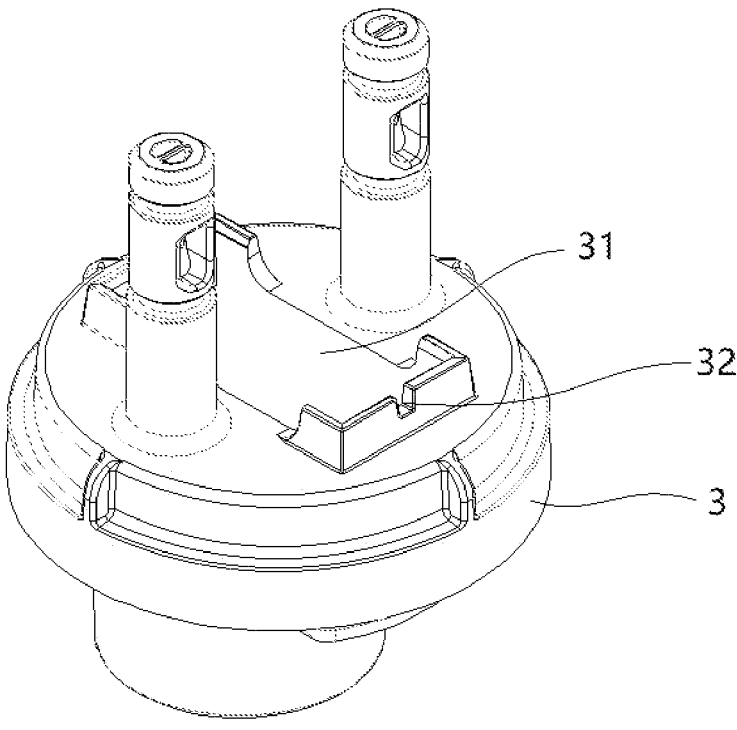
FIG. 12 is a structural schematic diagram of a filter cover.

As shown in FIG. 12, the filter cover 3 is provided with a mounting groove 31 for mounting the shell 21, and a positioning groove 32 is formed in the mounting groove 31 so as to ensure accuracy of the mounting position of the shell 21.

Obviously, the foregoing embodiment merely is an example for clearly illustrating, but not intended to define the embodiments. Those ordinary skilled in the art also can make other different forms of variations or changes on the basis of the illustration above. All embodiments do not need to, and also cannot, be exhausted herein. The apparent variations or changes made on the basis of the embodiment of the present disclosure are still within the scope of protection of the present disclosure.

What is claimed is:

1. A connection structure for a water purification filter element, comprising:
    a shell, which is configured to be mounted on a connection head of a filter element and has an upper opening; and
    a connector, which is partially mounted in a slidable manner in the upper opening, one end of the connector, which extends into the shell, having a first position configured to be fixed to an inner side wall of the shell and a second position wherein the end of the connector has been slid to be fixed to the top of the side wall of the shell, so that the connector has a separated state in which the connector has been slid in a direction of retracting into the shell to be separated from the connection head and a connected state in which the connector has been slid in a direction of extending out of the upper opening to be connected to the connection head;
    wherein the end of the connector, which extends into the shell, is rotatably connected with a shiftable block; a limiting space configured for the shiftable block to move therein and a blocking position configured to block the connector from completely extending out of the upper opening are formed in the side wall of the shell; when the shiftable block is positioned at the blocking position, the connector is positioned at the second position; a clamping position for keeping the position of the shiftable block unchanged is formed in the limiting space; when the shiftable block is positioned at the clamping position, the connector is positioned at the first position; the shiftable block is configured to be switched between the blocking position and the clamping position in the process of sliding in the limiting space so as to drive the connector to be switched between the second position and the first position.

2. The connection structure for the water purification filter element of claim 1, wherein an abutting portion disposed correspondingly to the shiftable block is formed in the limiting space; and in the process that the shell slides relative to the connector, the shiftable block touches the abutting portion and is enabled to rotate, so that the connector is switched between the first position and the second position.

3. The connection structure for the water purification filter element of claim 2, wherein chutes are respectively formed at both opposite ends of the shiftable block, turnable portions are formed at positions of the chutes on the shiftable block, and the turnable portions are in clamping fit with the abutting portion.

4. The connection structure for the water purification filter element of claim 3, wherein two turnable portions are formed on each end face with the chute.

5. The connection structure for the water purification filter element of claim 1, wherein the connector has a clamping portion and a connection portion, the clamping portion extends out of the shell and is configured to be clamped to the connection head, the connection portion is mounted in a slidable manner in the upper opening, and the connection portion has a sliding face in sliding contact with an inner wall of the upper opening.

6. The connection structure for the water purification filter element of claim 5, wherein the sliding face is of an arc shape, and the arc-shaped sliding face, in the process that the connection portion slides along the upper opening, drives the clamping portion to be deflected, so that the connector is switched between the connected state and the separated state.

7. The connection structure for the water purification filter element of claim 5, wherein
    the connector is also provided with a blocking portion, the clamping portion and the connection portion are respectively disposed on both sides of the blocking portion, the blocking portion is configured to abut against the upper opening to block the clamping portion from sliding into the shell.

8. The connection structure for the water purification filter element of claim 7, wherein an arc shape of the sliding face protrudes towards an extending direction of the blocking portion.

9. The connection structure for the water purification filter element of claim 7, wherein each connector is provided with the blocking portion, and the blocking portions of two connectors are arranged in a back-to-back manner.

10. The connection structure for the water purification filter element of claim 5, wherein two connectors are arranged opposite to each other; when the connectors are in the separated state, the clamping portions of the two connectors are close to each other in the first position; and when the connectors are in the connected state, the clamping portions of two connectors are away from each other in the second position.

11. The connection structure for the water purification filter element of claim 5, wherein an end portion of the connector, which is positioned in the shell, is connected with a supporting plate, and the supporting plate is mounted in a slidable manner in the shell; and one end of the supporting plate, which is away from the connector, is connected with a positioning plate, and the shiftable block is rotatably mounted on the positioning plate.

12. The connection structure for the water purification filter element of claim 11, wherein a limiting rib is arranged at a side edge of the positioning plate, a limiting edge is formed at the top of the inner side wall of the shell, and the limiting rib is configured to abut against a lower surface of the limiting edge to form the blocking position for blocking the connector from completely extending out of the upper opening; when the shiftable block is positioned at the blocking position, the limiting rib abuts against the limiting edge, and the connector is in the connected state; when the shiftable block is positioned at the clamping position, the connector partially retracts into the shell, the limiting rib is away from the limiting edge, and the connector is in the separated state; and the shiftable block is rotatably arranged on the positioning plate so as to be switchable between the blocking position and the clamping position.

13. The connection structure for the water purification filter element of claim 11, wherein the supporting plate is provided with a fixed rod, the fixed rod is sleeved with an elastic member, and the elastic member has a first elastic force for biasing the positioning plate to move towards the upper opening of the shell.

14. The connection structure for the water purification filter element of claim 13, wherein a bottom plate of the shell is provided with a guiding slot, and the elastic member is positioned in the guiding slot.

15. The connection structure for the water purification filter element of claim 11, wherein two connectors are connected with the supporting plate through elastic sheets, and when the connector is in the connected state, the elastic sheet has a second elastic force for biasing the sliding face to abut tightly against the inner wall of the shell.

16. The connection structure for the water purification filter element of claim 1, wherein the shell includes a fixing box and a fixing cover which are in clamping fit, and the upper opening is formed at the top ends of the fixing box and the fixing cover.

* * * * *